United States Patent [19]

Gunning et al.

[11] 3,895,826

[45] July 22, 1975

[54] PROCESS OF MAKING DISPERSION OF UREA-FORMALDEHYDE RESINS

[75] Inventors: Raymond Harry Gunning, Box Hill North; Frederick John Lubbock, Beaumaris, both of Australia

[73] Assignee: Dulux Australia Ltd., Melbourne, Australia

[22] Filed: Sept. 24, 1974

[21] Appl. No.: 508,994

[30] Foreign Application Priority Data
Oct. 4, 1973  Australia............................. 5102/73

[52] U.S. Cl......... 260/33.6 R; 260/29.4 R; 260/34.2
[51] Int. Cl..... C08g 9/10; C08g 51/28; C08g 53/18
[58] Field of Search.......... 260/29.4 R, 33.6 R, 34.2

[56] References Cited
UNITED STATES PATENTS

| | | |
|---|---|---|
| 3,284,393 | 11/1966 | Vanderhoff et al................ 260/34.2 |
| 3,412,034 | 11/1968 | McIntosh et al................... 260/34.2 |
| 3,759,864 | 9/1973 | Nicks............................. 260/33.6 EP |
| 3,849,378 | 11/1974 | Griffiths et al................ 260/29.4 R |

*Primary Examiner*—Donald E. Czaja
*Assistant Examiner*—H. H. Fletcher
*Attorney, Agent, or Firm*—Cushman, Darby & Cushman

[57] ABSTRACT

A process of preparing beads of urea-formaldehyde resin in which disperse particles of an aqueous urea-formaldehyde syrup are converted to hard polymer and azeotropically dehydrated. The aqueous syrup must have a solids content of at least 65% by weight and the mol ratio of formaldehyde to urea must be within the range of 1.9 – 2.3 to 1.

2 Claims, No Drawings

PROCESS OF MAKING DISPERSION OF UREA-FORMALDEHYDE RESINS

This invention relates to a process of preparing a texturing agent and filler comprising beads of urea-formaldehyde resin and to beads so-produced.

Powdered polymer in the form of particles ranging in size from about 50 micron to a few mm diameter have been prepared from bulk polymer such as poly(ethylene), poly(propylene) and phenol-aldehyde condensates. The use of such materials as fillers or texturing agents in, for example, moulded plastics articles and paints has been proposed. Particles of this type have been made by, for example, milling polymer at temperature below its glass transition temperature, which is a relatively costly process. The particles produced by the mechanical reduction of bulk polymer are frequently angular and this can give rise to uneven and hence unacceptable optical effects when used as, for example, texturing agents in paints.

Belgium Pat. No. 765,099 discloses the preparation of granules of amine-formaldehyde polymer by a dispersion process which converts particles of polymer precursor elements directly into polymeric granules. The granules so-produced are porous. They are permeated by a net-like web of inter-connected pores which are capable of imbibing liquids in which the granules are immersed and are referred to as "retiporous" particles. It is proposed that the granules be used as opacifying and texturing agents in a number of media including paints and plastics.

We have observed that the use of porous polymer particles as matting agents in certain products, notably matt and semi-gloss points, can lead to uneven and variable colour development in the dry paint films due, we believe, to uncontrollable and unpredictible imbibing of liquid constituents of the paint by the porous particles.

We have now discovered that solid polymer beads with diameters within the range of 1–100 microns can be produced from aqueous urea-formaldehyde syrups in the manner hereinunder described and that the beads so-produced can be used as texturing agents and fillers with certain advantages, which will become apparent from our disclosures, over the above-mentioned retiporous granules for some specific applications. Our process involves preparing the beads in the form of an anhydrous slurry, which can be used directly in, for example, non-aqueous paint compositions or which can be dried to produce solid beads in the form of a dry powder.

The process we now disclose involves the dispersion of an aqueous urea-formaldehyde convertible syrup in a hydrocarbon liquid in globules of approximately the diameter of the required beads, curing of the convertible syrup to solid, cross-linked polymer and azeotropic stripping of water from the system to give an anhydrous slurry of beads in hydrocarbon liquid. Optionally, the hydrocarbon liquid can be removed, for example by drying under reduced pressure, to produce a dry powder of solid beads.

The general principles of formulating convertible urea-formaldehyde syrups are well-known in the art and the selection of this component for use in our invention demands no more than the exercise of known principles of polymer technology. However, we have found that two unusual requirements must be met if satisfactory beads are to be made; the mol ratio of formaldehyde to urea used to prepare the convertible syrup must be 1.9 – 2.3 to 1 and the solids content of the syrup must be at least 65% by weight. If these requirements are not met, cavities or pores will normally form in the beads.

Although the convertible constituents of the syrups we use are essentially urea-formaldehyde reaction products, it is known that minor additions of other carbamides, amino-triazines and compounds of similar chemical structure may be made to the urea to imbue the final cured resin with modified mechanical properties. Such minor modifications are comprehended in our use of the term urea-formaldehyde convertible syrup.

The convertible syrup is dispersed with mechanical agitation in the form of discrete globules in a non-aqueous liquid continuous phase in which it is insoluble, in the presence of a stabiliser and thickener, to produce disperse particles of the order of size required in the completed beads. The diameter of the disperse globules is controlled by known techniques, utilising time and rate of agitation and the relative viscosities of the continuous and disperse phases to arrive at the required disperse globule diameters.

The non-aqueous liquid in which the convertible syrup is dispersed must be a non-solvent for and chemically inert toward the reactive constituents of the convertible syrup and the granules. By the reactive constituents of the syrup we mean those precursor elements which, on further condensation, form the polymer of the granules. In general, this will mean that the non-aqueous liquid is incompatible with the convertible syrup. For example the liquid may be an essentially aliphatic hydrocarbon such as heptane, hexane or a commercial mixture of hydrocarbons, e.g., petroleum ether and white spirits. Alternatively the non-aqueous liquid may comprise other liquids, for example aromatic hydrocarbons, e.g., toluene, xylene and petroleum naphthas. It is not essential that the non-aqueous liquid be completely insoluble in the convertible syrup provided it does not dissolve the reactive constituents and cause them to pass into the continuous phase of the dispersion. Furthermore, when there is present in the non-aqueous liquid a proportion of a liquid which has a measurable solubility in the aqueous syrup, a proportion of the soluble liquid may partition into the aqueous syrup. This is not objectionable provided the solids content of the disperse globules of convertible syrup is not reduced below 65% by weight. Conversely, if a proportion of the aqueous liquid partitions into the continuous phase, this also is not objectionable provided the convertibility of the syrup is not affected.

Effective stabilisation of the disperse globules is provided by dissolving in the continuous phase a polymeric amphipathic stabiliser comprising segments which are soluble in the continuous phase and components, for example hydroxyl groups, which have an affinity for the disperse globules. Suitable amphipathic stabilisers are, for example, hydroxyl-containing addition polymers of ethylenically unsaturated monomers, containing 5–20 mol percent of hydroxyl groups. For example, a suitable stabiliser for use in an aliphatic non-aqueous liquid is a copolymer of 2-ethyl hexyl acrylate and hydroxy propyl methacrylate. If the non-aqueous liquid comprises some aromatic ring compounds such as toluene and xylene, we would replace the 2-ethyl hexyl acrylate with styrene. The stabiliser is typically used at concentrations of the order of 1% by weight of the continuous phase.

We also require that the continuous phase shall be sufficiently viscous to provide an efficient dispersion medium for the convertible aqueous syrup. The viscosity is increased by dissolving therein a soluble polymeric material, the nature of which is not critical and conveniently related to the intended end-use of the beads. For example, if the beads are to be used as texturing agents in alkyd resin enamels, it would be satisfactory to use a similar alkyd resin as the thickening agent, thus avoiding the need to remove what might otherwise be a harmful contaminant from the beads after they are converted, before they could be used in the enamel. It may well be that the stabiliser will itself provide sufficient viscosity in the continuous phase or it may be convenient to add excess stabiliser to serve the dual role of thickener. In general, therefore, we find that the amount of thickener used will vary from zero to 15% by weight of the continuous phase.

Condensation of the disperse syrup globules to hard polymer is induced by adding a suitable catalyst, for example a mineral acid, e.g., sulphuric acid, to the dispersion. The catalyst may be added prior to, during or after the formation of the initial dispersion. Optionally the dispersion may be heated to accelerate the reaction. Although the choice of catalyst is not critical, we prefer to use sulphuric acid because excess catalyst can be readily disposed of by reacting it with calcium carbonate. The calcium sulphate so formed is normally not an objectionable impurity in the beads.

We prefer to use a concentration of catalyst which will cause gellation of the dispersed globules within about one hour, a typical concentration being 0.3% by weight of 20% sulphuric acid, based on the weight of syrup to be converted. Complete curing of the beads to the hard condition usually requires some 24 hours.

The slurry of beads so-produced is then azeotroped, that is it is boiled under reflux conditions and water stripped off from the reflux condensate, the non-aqueous condensate being returned to the batch. Azeotroping is continued until no further water is being stripped from the batch.

If required, the beads can be concentrated, e.g., by filtration or centrifuging and finally dried, for example by heating under partial vacuum, to provide a dry, powdered mass of beads. However when, for example, the beads are to be used as texturing agents in non-aqueous paints, it is more usual to avoid the expense of drying by incorporating then directly in the paint as a slurry.

The beads may optionally be pigmented to impart opacity and or colour to them or to modify their mechanical properties. This is done by dispersing pigment in the convertible aqueous syrup before it is dispersed in globules. The process proceeds otherwise as described hereinabove. There are no limitations imposed on the selection of pigment other than the predictible one that the pigment shall be inert with respect to the polymerisation reaction. It can be dispersed in the syrup by the usual techniques, for example by the use of a high-speed stirrer. A particularly useful pigment is titanium dioxide, which we have used to produce opaque matting and texturing agents of this type.

This invention is illustrated by the following examples in which all parts are given by weight:

EXAMPLE I

Preparation of solid spheroidal polymer granules by the condensation of an aqueous syrup of a low molecular weight urea-formaldehyde condensate precursor (formaldehyde/urea molar ratio 2.2/1), the aqueous syrup being dispersed as discrete particles in a hydrocarbon solution of a stabilizer and a thickener.

The convertible aqueous syrup was prepared by heating the following mixture to reflux and holding for 5 minutes.

| | |
|---|---|
| Water | 20.80 parts |
| Triethanolamine | 0.05 parts |
| 80% paraformaldehyde | 45.83 parts |
| Urea | 33.32 parts |

The mixture was made acid by the addition of 0.005 parts of formic acid, refluxing resumed for 2¾ hours, 0.31 parts of a 10% by weight aqueous solution of potassium hydroxide added and the syrup cooled.

This syrup had a Gardner-Holdt viscosity of H. When 100 parts of the syrup was mixed with 0.8 parts of a molar solution of sulphuric acid the mass gelled in 70 minutes.

The stabiliser was prepared by the addition polymerisation of the following mixture in 500 parts of refluxing xylene.

| | |
|---|---|
| Styrene | 123.0 parts |
| Methyl methacrylate | 84.0 parts |
| Butyl acrylate | 134.0 parts |
| Butyl methacrylate | 75.0 parts |
| Hydroxy propyl acrylate | 80.0 parts |
| Acrylic acid | 5.0 parts |
| Dietertiary butyl peroxide | 4.0 parts |

This stabiliser solution had a Gardner Holdt viscosity of U.

The thickener used in this example was a 40% by weight solution of poly(methyl methacrylate) in toluene, the polymer having a relative viscosity of 1.170. Relative viscosity is defined as the ratio of the absolutely viscosity of a solution of a polymer in a solvent to the absolute viscosity of the pure solvent and is an art-recognised method of specifying a particular molecular weight range (see, for example, "Textbook of Polymer Science" (2nd Edition) by Billmeyer (Wiley-Interscience), page 84).

Condensation and granulation of the aqueous syrup was carried out by rapidly dispersing 200 parts of the above syrup mixed with 1.6 parts of molar sulphuric acid into a mixture of 5.0 parts of stabiliser, 50.0 parts of thickener and 50 parts of xylene. The beads so-prepared showed no internal structure and had an average diameter of approximately 20 micron. 150 parts of toluene were then added and the bead slurry allowed to stand to allow the cure to proceed to completion.

Water was then removed from the system by azeotropic distillation to give an anhydrous slurry of solid urea-formaldehyde beads.

EXAMPLE II

The procedure of example I was repeated except that the aqueous syrup was prepared from formaldehyde and urea in the ratio of 1.7 to 1. This gave a cloudy syrup which contained insoluble particles and produced unsatisfactory beads which were cloudy and of nonspherical shape.

EXAMPLE III

The procedure of example I was repeated but 55 parts of water were added to the aqueous syrup to reduce the solids to 55% by weight. The beads produced from this syrup were cellular and porous and when dried could be observed under a microscope to imbibe liquid when immersed in an alkyd resin solution.

EXAMPLE IV

Preparation of solid pigmented spheroidal polymer granules.

The preparation of these pigmented granules was carried out using the methods, materials and quantities of Example I except for the replacement of the condensation and granulation stage of that example by the following stage.

100 parts of rutile titanium dioxide pigment were dispersed in 200 parts of the convertible aqueous syrup of Example I by high speed mixing. 2.5 parts of 2.5 molar sulphuric acid were then mixed into this dispersion, and the dispersion was rapidly dispersed into a mixture of 5.0 parts of stabiliser, 50.0 parts of thickener and 50 parts of xylene. The remainder of the preparation was identical to that of Example I.

The beads prepared by the above method contained pigment which was uniformly distributed throughout them. They had an average diameter of approximately 20 micron and showed no internal structure.

We claim

1. A process of preparing beads of urea-formaldehyde resin in which an aqueous urea-formaldehyde convertible syrup which has a solids content of at least 65% by weight and a mol ratio of formaldehyde to urea of 1.9 – 2.3 to 1 is dispersed in the form of globules in a hydrocarbon liquid in the presence of a stabiliser for the dispersion and from 0 to 15% by weight of the continuous phase of a polymeric thickener therefor, converting the disperse syrup globules to hard polymer by adding a catalyst for the curing reaction and then azeotropically stripping water from the system to give an anhydrous slurry of solid polymer beads with diameters within the range of 1–100 microns in hydrocarbon liquid.

2. A process according to claim 1 wherein the catalyst for the curing reaction is sulphuric acid.

* * * * *